March 26, 1935.  C. A. JACKSON  1,995,613
POWER CONTROL SYSTEM
Filed July 1, 1930  2 Sheets-Sheet 1

INVENTOR
Charles A. Jackson
BY
Edward A. Lowry
ATTORNEY

March 26, 1935. C. A. JACKSON 1,995,613
POWER CONTROL SYSTEM
Filed July 1, 1930 2 Sheets-Sheet 2
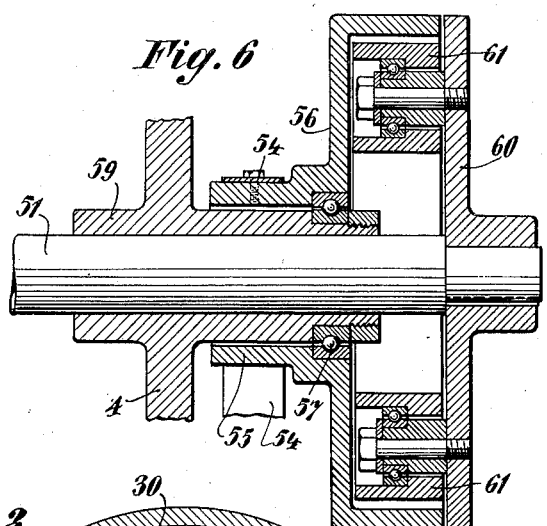
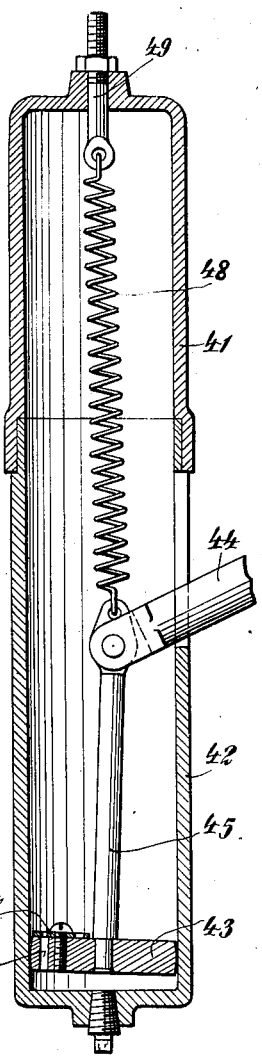
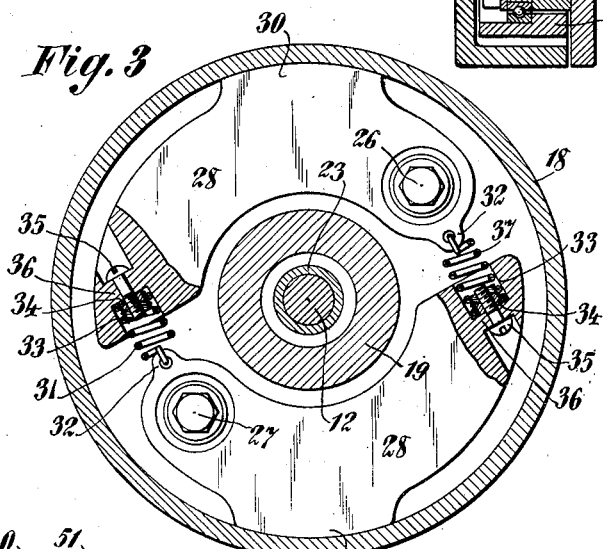
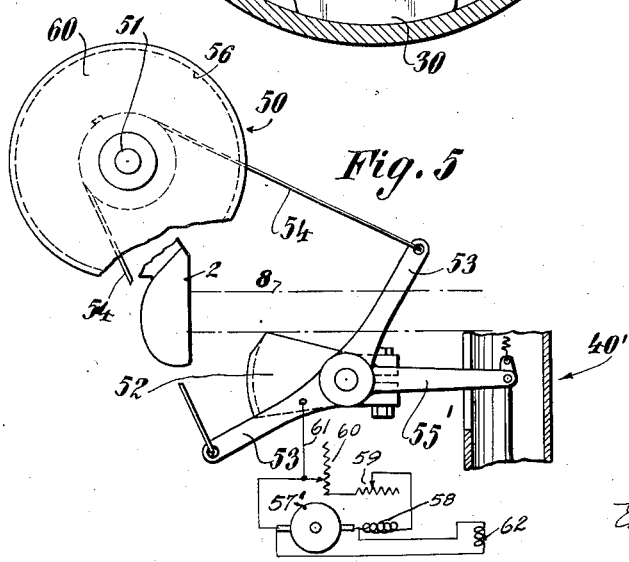
INVENTOR
Charles A. Jackson
BY
Edward M. Hall ATTORNEY Patented Mar. 26, 1935

1,995,613

UNITED STATES PATENT OFFICE 1,995,613

POWER CONTROL SYSTEM

Charles A. Jackson, Ridgewood, N. J.

Application July 1, 1930, Serial No. 465,079

5 Claims. (Cl. 253—24)

This invention relates generally to governors and more particularly to an improved speed governor especially adapted for controlling hydraulic turbines although its applicability to other types of prime movers will be readily understood by persons skilled in the art.

Various types of speed governors have heretofore been proposed but the same are for the most part too expensive for application to a prime mover of relative small power capacity. These governors, such for example as of the centrifugal fly ball type, pilot valve type or fluid pump type, require attention to maintain the same or keep the same in perfect operating condition or adjustment. This is particularly troublesome in small installations.

However, my improved governor arrangement is relatively inexpensive and requires practically no attention due to the elimination of the usual fly ball head, pilot valves, restoring mechanisms, or other devices or linkages especially adapted for hydraulic turbines. It is by the provision of an extremely simple frictionally operated type of speed governor that I am able to directly control the power input to the prime mover from the governor without necessitating the use of these usual forms of devices. My improved arrangement not only has this high degree of simplicity and reliability but also maintains a very high degree of speed regulation even without restoring mechanism. In one aspect of the invention a deflector is employed for diverting part of the jet which normally impinges upon the buckets of an impulse although it will of course be understood that other flow regulating devices may be employed and operatively connected to my improved speed governor in any suitable manner as will be determined by the type of flow mechanism employed.

It is an object of my invention to provide an improved friction type governor while a still further object is to provide a governor adapted to be directly connected to the flow control mechanism. Still another object of my invention is to provide a frictionally operated governor adapted in cooperation with a suitable spring and dash-pot, or equivalent elements, to so control the power input to the turbine that a substantially constant speed will prevail over practically the whole power range of the turbine. Such a highly desirable result is obtained without any hunting even though no restoring mechanism is used. Such a result is due in part to the elimination of any lost motion between the speed governor element and the flow control mechanism and is also contributed to by the proper proportioning and design of the various parts whereby various of their operating characteristics will tend to balance each other thereby eliminating the probability of unbalanced mechanical or hydraulic forces. While these forces may, or may not be wholly eliminated by my improved arrangement, yet they will be sufficiently reduced so as to not appreciably affect the speed regulation.

Another and more specific object of the invention is to provide an arrangement which is relatively economical in manufacture, maintenance and operation, and will require relatively little, if any, attention, thereby permitting my improved speed governor to be applied to small prime movers of the hydraulic driven type which can be used in various classes of work not heretofore available for governor controlled units. One such use is in connection with emergency lighting sets which are disposed in theatres, hospitals, or similar places where it is highly necessary to provide emergency equipment for maintaining the exit lights or other equipment such as is essential in times of emergency.

In view of the foregoing it is readily seen that my governor, with its inexpensive construction and operation and speed control characteristics, is very suitable for controlling an alternating current generating set of relatively small power for in such a case close speed regulation and control is essential to maintain satisfactory frequency regulation and yet due to the small size of the unit the initial cost must be kept low.

Other objects and advantages will be readily understood by those skilled in the art and it will also be apparent to such persons that various changes and modifications may be made from the specific aspects of the invention described in connection with the accompanying drawings; in which Fig. 1 is a side elevation of an impulse type of hydraulic turbine with my improved governor applied thereto, parts being broken away to show details of the deflector and nozzle.

Fig. 3 is a transverse section taken on the line 3—3 of Fig. 2.

Fig. 4 is a vertical sectional view of the dash-pot.

Fig. 5 is a diagrammatic side elevation of a modified form of my improved governor with improved electrical control equipment associated therewith, this equipment also being applicable to my preferred form merely by connection to any of the oscillating elements thereof such, for instance, as the pin connecting the friction head and dash-pot.

Fig. 6 is a sectional view of the modified form showing the governor directly attached to the prime mover shaft.

Figure 1:
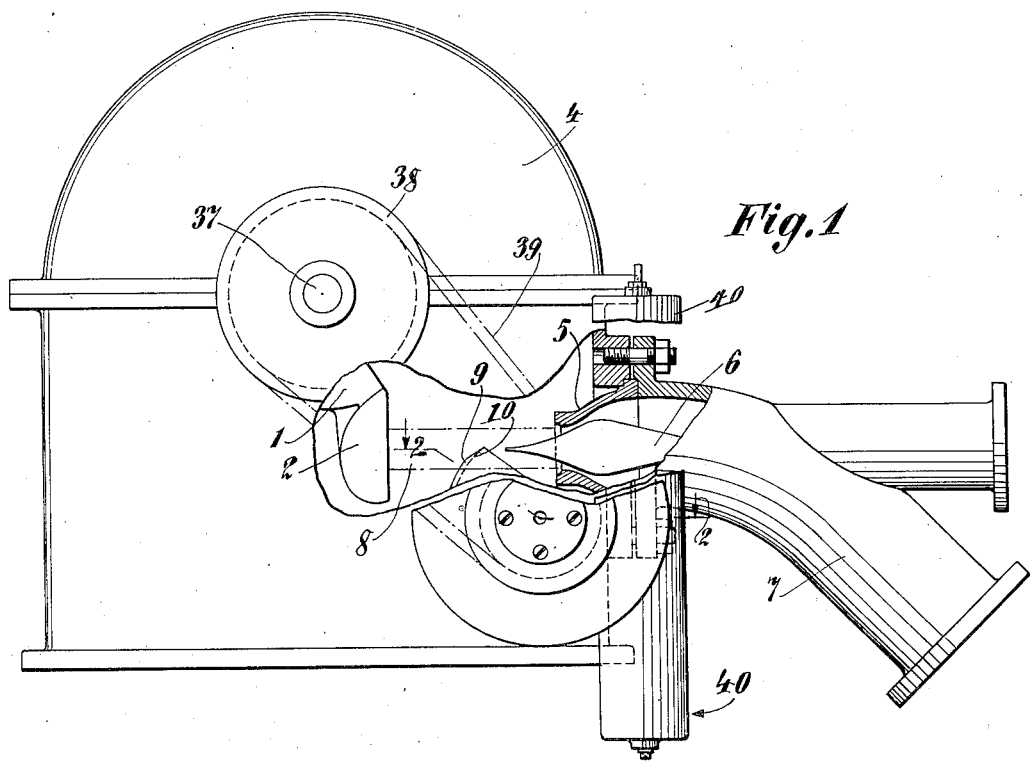

While I have illustrated my invention in connection with a hydraulic impulse turbine having a pivoted deflector it will, of course, be understood that various other types of deflectors or flow control devices, as well as nozzles of types other than shown, may be employed. It will also be apparent that my improved governor may be employed with reaction types of turbines as well as other types of prime movers and also that if desirable under certain conditions my improved governor may be employed in connection with a variety of purposes and machines. In the specific aspect of the invention there is shown an impulse wheel 1 having a series of circumferentially arranged buckets 2 mounted for rotation about a shaft 3 which is journaled within suitable bearings on each side of a split housing 4. A conventional type of nozzle 5 is shown as removably secured in an opening of the wheel casing and herein is provided with an adjustable needle 6 which, as well known in the art, may be either manually adjusted or actuated by a suitable servo-motor or if desired the needle could be wholly omitted and a suitable inlet valve provided at some point in the inlet 7. As shown a jet of water 8 of cylindrical form would impinge upon the buckets 2.

To control the speed of the turbine there is provided a conventional type of deflector or flow control element 9 comprising an arcuate deflecting portion 10 having a knife-edge for cutting into the jet. This deflector is supported by two side ribs 11 extending radially from a hub which is secured to a rock-shaft 12.

Figure 2:
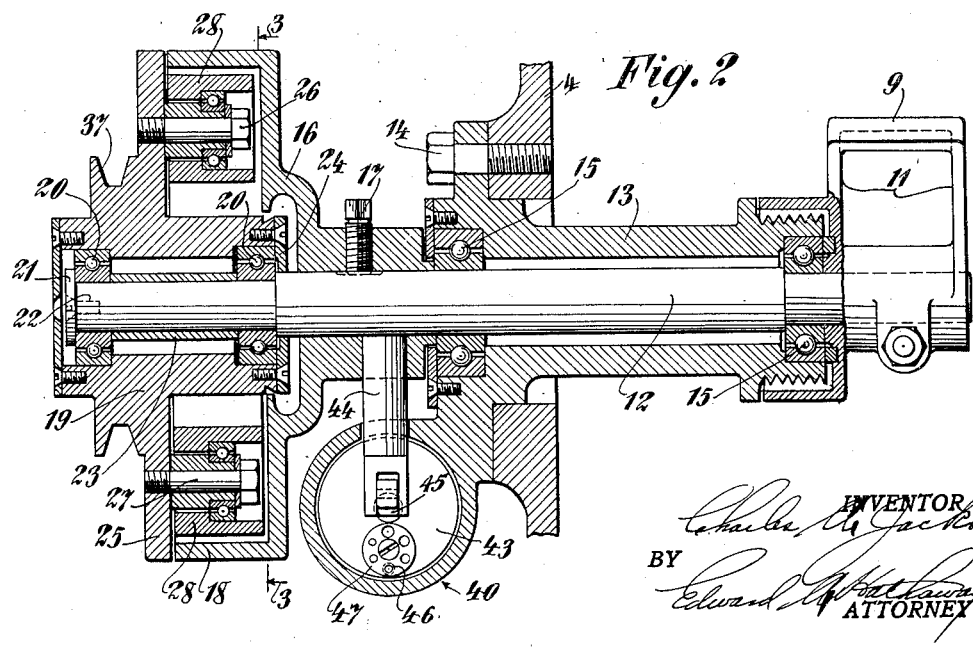
Fig. 2 is an enlarged sectional view of the governor taken substantially on the line 2—2 of Fig. 1.

To move this deflector into or out of the jet and thus control the power input to the turbine, rock shaft 12 is journaled within a sleeve 13 which projects laterally inwardly from the side of the wheel housing and is removably secured thereto as by bolts 14. To reduce friction to a minimum and thereby improve the sensitiveness and speed regulation, shaft 12 is mounted preferably in ball-bearings 15. The speed governor head consists of what is herein called a friction element having a hub 16, secured to shaft 12 as by a set-screw 17 or other suitable means, and an annular flange 18 the inner surface of which is machined to provide the necessary friction surface. The cooperating element of the governor which is herein termed the centrifugal or speed head, due to being driven by the turbine rotor or wheel, comprises a hub 19 journaled preferably in ball-bearings 20 on the outer end of rock shaft 12, these bearings being held in place by an end-plate 21 which is secured to shaft 12 by a screw 22. A suitable spacing bushing 23 and retainer plate 24 prevent axial displacement of hub 19. This hub is provided with a radial flange 25 to which is pivotally secured, Figs. 2 and 3, at diametrically opposite points 26 and 27 centrifugally operated weights 28, each of which is provided with a projection or friction shoe 30. The surface of these shoes conforms to the inner surface of flange 18 when the weights are in their outermost position. To provide the necessary centripetal force there is provided for each weight a spring 31 hooked into an eye 32 formed rigid with the weights while the other end of the spring is received within a suitable bore 33. A nut 34 is threaded into the interior of the spring thereby permitting a screw 35 to adjustably engage the nut from the opposite side of a boss 36. The spring and supporting structure for the other of the weights is identical to the one just described and hence need not be described again. It will be seen from this construction that theoretically the pivots 26 and 27 are not subjected to any radial bearing forces with respect to the center of rotation as all of the forces are self-contained and balanced.

To drive the centrifugal head or speed element, hub 19 is provided with a belt groove 37 which is connected as by a belt 38 preferably to a larger pulley 39 secured to the turbine shaft 3 although any other usual type of gear drive could be used. Any suitable speed ratio could be used between the pulleys 37 and 38 depending upon the degree of friction desired between the centrifugal weights and friction element, the degree of friction being determined by the desired degree of sensitiveness and the forces to be overcome.

To prevent hunting or other tendencies for unstable operation a dash-pot generally indicated at 40 is formed preferably with its lower portion 41 integral with the bolt flange of sleeve 13 while the upper portion 42 is removably secured to the lower portion. The deflector shaft 12 is connected through hub 16 to the dash-pot piston 43 as by a radially extending arm 44 rigidly secured to hub 16 as by a force fit or threaded connection. The inner end of radial pin 44 is bifurcated to pivotally receive a piston rod 45. To eliminate the necessity for a cross head guide the periphery of piston 43 is sufficiently curved around its entire circumference to permit angular displacement thereof during reciprocation. Oil is preferably normally maintained in the lower portion of cylinder 42 and in order to adjust for the rate of dash-pot action a small by-pass 46 is provided with an overlying adjustable disk 47 which has a series of circularly arranged openings of different diameters, any one of which may be brought into registry with by-pass 46 and thus determine the degree of leakage therethrough. To balance the frictional forces between the weights 28 and the flange 18, a spring 48 is housed within the dash-pot cylinder and connected at one end to piston rod 45 and at its other end to an adjustable eye bolt 49.

The operation of this form of my improved control arrangement is as follows: With the turbine wheel stationary, deflector 9 is entirely out of the path of the jet whereby upon starting the turbine the full jet will act upon the wheel until its speed has approached a predetermined value or normal in which event the hub 19 of the speed element is being driven at such a rate through belt connection 39 as to cause weights 28 to be thrown outwardly in close juxtaposition to, but not necessarily in actual contact with, the inner surface of flange 18. However, if the power of the jet is in excess of that necessary to maintain the predetermined speed, the wheel will tend to increase its speed above normal whereupon sufficient frictional contact is instantly established with flange 18 so as to cause partial rotation thereof in a direction to move deflector 9 into the jet. This will instantly deflect part of the jet and accordingly decrease the power input to the turbine and thus maintain a predetermined speed. During movement of the deflector either into or out of the stream, the spring 48 and dash-pot piston 43 will effectively stabilize the operation of the deflector so as to completely eliminate the need of any restoring mechanism such as is always necessary in speed governors especially for hydraulic turbines. It is found that upon an increase in speed of the turbine the deflector is instantly moved a predetermined distance into the stream and almost equally as quickly is partially moved back where it immediately stops dead and so remains until further variation in load or water pressure when it is again responsive. This slight over-running of its normal position with instantaneous correction, contributes to the very high degree of speed regulation possible with this arrangement. Certain of the compensating factors in the arrangement consist in having the hydraulic forces on the deflector equalized in certain positions thereof and that when the deflector is moved past the point where its fluid pressures equalize, any unbalance which might be present is practically wholly compensated for by the increase in tension of the dash-pot spring 48, the angularity of the radial pin 44 and other contributing factors.

In the modification shown in Fig. 5, the centrifugal and frictional elements are mounted on the wheel shaft. These elements are generally indicated at 50, Fig. 5, and the wheel shaft at 51. The deflector 52 is of the pivoted type and is provided with two arms 53 to which is attached an endless belt or equivalent linkage element 54. This element passes around and is positively secured to a flange 55 formed on the frictional element 56 which is journaled preferably on ball bearings 57, the bearings in turn being carried by the wheel shaft bearing 59 which is secured to the wheel housing. Secured to the outer end of the wheel shaft is the speed or centrifugal element including the flange 60 which carries centrifugal weights 61. Inasmuch as the weights and associated structure are identical to the form shown in Fig. 3 further details thereof need not be described.

The operation of this form will be apparent from the previous description in that when the turbine speed increases above the predetermined normal value the friction element 56 will be partially rotated, thereby pulling on the lower strand of the element 54 and thus move the deflector 52 into the jet. A suitable arm 55' connects the pivot shaft of the deflector with a dash-pot mechanism 40' which is identical to the dash-pot mechanism 40. The action of this dash-pot in cooperation with the deflector and frictional governor head is the same as in the preferred form.

There may be applied to both forms an improved control for a dynamo-electric machine, for instance, the exciter generator for an alternator field generally indicated at 62. Such an exciter is shown, Fig. 5 at 57', the field 58 of which is connected through a hand adjusted resistance 59 and an automatically adjusted resistance 60. The adjustable element of resistance 60 is suitably connected as by a link 61 to one of the arms 53 whereby it will be seen that as the speed tends to vary from normal the excitation of the exciter field will be varied so as to maintain constant voltage on the alternator field. Also, as the load increases on the alternator with consequent withdrawal of the deflector from the jet, the resistance will be progressively decreased with a corresponding increase in field excitation. This will compensate for the normal characteristic of the alternator which causes the voltage to drop perceptibly as the load builds up unless additional field excitation is provided. It is thus seen that by this arrangement I have provided not only an improved frictionally operated speed governor but also an improved mode of operation for coordinating voltage control therewith.

While I have thus shown two modifications of my invention it will of course be understood by persons skilled in the art that various changes and modifications may be made without departing from the spirit of the invention as set forth in the appended claims.

I claim:

1. A governor system for an impulse turbine having means forming a jet therefor, comprising, in combination, means for controlling the turbine speed including a continuously rotatable centrifugal element driven by said turbine, an oscillatable jet deflector adapted to cut into the jet to separate and deflect a portion of the flow therefrom, means operable solely through frictional contact directly with said centrifugal element for variably deflecting said deflector in one direction into said jet thereby to control turbine speed, and means for yieldably resisting said deflection.

2. A governor system for an impulse turbine having means forming a jet therefor, comprising, in combination, means for controlling the turbine speed including a continuously rotatable centrifugal element driven by said turbine, an oscillatable jet deflector adapted to cut into the jet to separate and deflect a portion of the flow therefrom, means operable solely through frictional contact directly with said centrifugal element for variably deflecting said deflector in one direction into said jet thereby to control turbine speed, and means for yieldably resisting said deflection including a dashpot and spring.

3. A governor system comprising, in combination, a hydraulic impulse turbine having a jet deflector adapted to cut into the jet to separate and deflect a portion of the flow therefrom thereby to control the amount of power to the wheel and accordingly its speed, a shaft operatively connected to said deflector to oscillate the same into and out of the jet, a hub having an annular flange secured to said shaft, a carrier member journalled for rotation coaxially of said shaft, centrifugal weights supported by said carrier and projecting within said annular flange to variably frictionally engage the same, and means for continuously driving said carrier member and centrifugal weights by said turbine whereby variations in speed of said turbine will cause said deflector to cut into the jet and control the turbine speed.

4. The combination set forth in claim 3 further characterized in that said carrier is journalled upon said shaft.

5. The combination set forth in claim 3 further characterized in that said deflector is of such shape as to be substantially balanced when cutting into and deflecting a portion of the jet, and a dashpot operatively connected to said shaft for controlling oscillation thereof whereby said deflector upon its initial deflecting movement may be moved to an over-deflecting position and then brought back to its normal deflecting position.

CHARLES A. JACKSON.